United States Patent [19]

Tar

[11] Patent Number: 4,459,484
[45] Date of Patent: Jul. 10, 1984

[54] RADIATION DETECTOR FOR A FLAME ALARM

[75] Inventor: Domokos Tar, Stäfa, Switzerland

[73] Assignee: Cerberus AG, Männedorf, Switzerland

[21] Appl. No.: 321,113

[22] Filed: Nov. 13, 1981

[30] Foreign Application Priority Data

Dec. 3, 1980 [CH] Switzerland .................... 8921/80

[51] Int. Cl.³ ............................................. G01J 1/00
[52] U.S. Cl. ................................... 250/338; 250/339; 250/340
[58] Field of Search ................. 350/1.6, 1.7; 250/338, 250/339, 340, 342

[56] References Cited

U.S. PATENT DOCUMENTS

| 3,033,701 | 5/1962 | Wozniak | 350/1.6 |
| 4,280,058 | 7/1981 | Tar | 250/339 |
| 4,415,806 | 11/1983 | Tar | 250/339 |

FOREIGN PATENT DOCUMENTS

| 1014230 | 12/1965 | United Kingdom. | |
| 2065916 | 7/1981 | United Kingdom | 250/353 |

OTHER PUBLICATIONS

Lubezky, "Multilayer Edge Filter for the 3.2–4.9 μm Range", Applied Optics, 17 (6), Aug. 15, 1978, pp. 2648–2649.
"Prog. Rpt. No. 3: Infrared", Bausch & Lomb Trade Brochure, Rochester, N.Y., Sep. 1958, 11 pages.

Primary Examiner—Janice A. Howell
Assistant Examiner—Carolyn E. Fields
Attorney, Agent, or Firm—Werner W. Kleeman

[57] ABSTRACT

A radiation detector contains a sensor element constituted by a pyroelectrical element, for instance formed of lithium-tantalate, lead-zirconate-titanate, lead-zirconate-iron-niobate or polyvinyldifluoride. Arranged forwardly of the sensor element is a filter combination constituted by a first filter element comprising a germanium or silicon filter having vapor-deposited thereon a narrow band filter having a transmission or throughpass maxima at about 4.3–4.4 μm, and a further filter element formed of sapphire or rutile or a calcium aluminate-, germanate- or a magnesium-fluoride glass. This filter combination has a transmission maxima at the resonance radiation of carbon dioxide at 4.3–4.4 μm, while all other wavelength regions are damped by a factor of more than 1000. Furthermore, there can be provided an additional or auxiliary filter which absorbs radiation in the region of 3.5–4.0 μm transmitted by the narrow band filter in the presence of angular or oblique incidence of such radiation. A flame alarm equipped with a radiation detector of this type responds extremely selectively to flame radiation, while not responding to spurious radiation, such as solar radiation or daylight, artificial light sources and welding sparks, even if the intensity of this spurious radiation is more than thousand-fold the intensity of the flame radiation. Thus, flames of minimal intensity are detected in a reliable, sensitive and trouble-free manner, even with the presence of strong spurious radiation.

23 Claims, 1 Drawing Figure

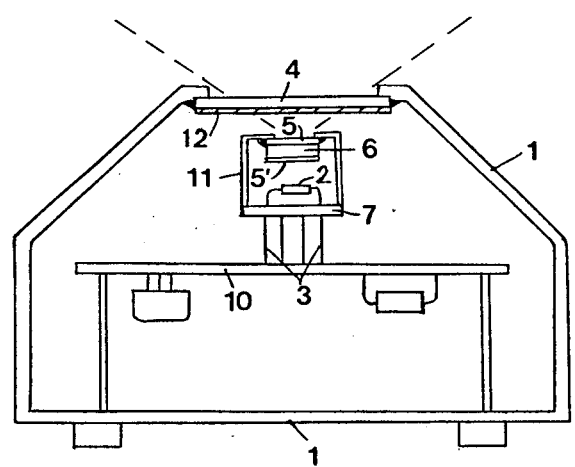

RADIATION DETECTOR FOR A FLAME ALARM

CROSS REFERENCE TO RELATED CASE

This application is related to my commonly assigned, copending U.S. application Ser. No. 06/031,431, filed Mar. 30, 1981, now U.S. Pat. No. 4,280,058, granted Jul. 21, 1981.

BACKGROUND OF THE INVENTION

The present invention relates to a new and improved construction of radiation detector for a flame alarm which is provided with a sensor element and arranged forwardly thereof a filter arrangement permeable or transmissive for the resonance radiation of carbon dioxide.

In practice, flame alarms are exposed to various types of spurious radiation which can trigger a false alarm signal. From Swiss Patent No. 509,633 and its cognate U.S. Pat. No. 3,739,365, Swiss Patent No. 537,066 and its cognate U.S. Pat. No. 3,716,717 or Swiss Patent No. 558,577 and its cognate U.S. Pat. No. 3,940,753 there are known to the art flame alarms which, for the purpose of differentiating a flame from spurious radiation, such as daylight, solar radiation or artificial light sources, make use of the different characteristics or properties of flames. For instance, there is resorted to employing the irregular flickering of flames and the thus resultant irregular intensity fluctuations of the flame radiation, or the particular color temperature or spectral composition of the flame radiation. However, since certain spurious radiation can contain radiation constituents with similar properties or characteristics and since such spurious radiation in practice often is more intensive by several orders of magnitude than the flame radiation which is to be detected, such flame alarms are not completely foolproof against false alarms and can not be set to the highest possible sensitivity.

From French Patent No. 2,151,148 and the article of K. Nakajima, appearing in the journal "Report of Fire Research Institute of Japan", 30 (Dec. 1969), at pages 55–61, it has become known that the radiation of a flame primarily is formed of a narrow band intensity peak in the spectral range of the resonance radiation of carbon dioxide at about 4.3–4.4 $\mu$m, apart from a considerably weaker wideband spectral region in the range of visible radiation and near infrared. The carbon dioxide-resonance radiation almost exclusively occurs with flames resulting from the combustion of organic materials, but hardly ever or only with decreasing intensity in the case of spurious radiation. A flame alarm which evaluates, apart from other criteria, essentially the resonance radiation of carbon dioxide therefore is considerably more foolproof against giving of a false alarm and less prone to disturbances than flame detectors which evaluate ultraviolet radiation, visible light or near infrared.

However, flame alarms evaluating the resonance radiation of carbon dioxide were associated with the disadvantage that the radiation detectors employed therein were too wideband and transmitted other parts or components of the radiation. Conventional interference filters for 4.3 $\mu$m possess, for instance, sidebands which are located in near infrared or in the visible region, so that spurious radiation occurring in these spectral ranges equally is detected. Thus, Nakajima employed a filter specially manufactured by the United States firm, Optical Coating Laboratory. This special filter, while encompassing carbon dioxide-resonance radiation, still is too wideband for practical applications (3.9–5.2 $\mu$m). In order to eliminate neighbouring spurious radiation, there must be used a lead selenide photoelement which is capable of eliminating radiation having a greater wavelength than 4.3 $\mu$m. What is here disadvantageous is that at standard or room temperature the carbon dioxide-resonance radiation already is located at the edge of the sensitivity decrease or descent. Thus, the flame radiation cannot be fully exploited, the sensitivity of the flame alarm does not reach the optimum possible value and the radiation receiver cannot be optimumly selected. In addition, lead selenide sensors have the disadvantage that they only can be used up to about 55° C. A further problem of interference filters consists in the angle dependency of the transmission curve. With an angular or oblique incidence of the radiation upon the filter the bandpass shifts to a certain extent towards the shorter wavelengths. This can lead to the drawback that with an angular incidence of the foreign or spurious radiation the flame alarm can be disturbed or malfunction.

In German Patent Publication No. 2,823,411 there has been disclosed a flame alarm whose radiation receiver contains a filter arrangement composed of a quartz filter and a germanium filter. The quartz filter defines an upper limit of the radiation at about 4.5 $\mu$m, while the germanium filter blocks radiation below 1.5 $\mu$m. This arrangement has the shortcoming that the absorption region of the quartz filter already extends into the resonance region of carbon dioxide, so that part of the resonance radiation is absorbed. Therefore, the sensitivity of a flame alarm of this type equally is not yet optimum.

SUMMARY OF THE INVENTION

Hence, with the foregoing in mind it is a primary object of the present invention to provide an improved construction of flame alarm which effectively avoids the aforementioned limitations and drawbacks of the prior art proposals.

Another and more specific object of the present invention is to provide an improved construction of flame alarm which is less prone to disturbances and to giving false alarms and works with higher sensitivity.

Now in order to implement these and still further objects of the invention, which will become more readily apparent as the description proceeds, the flame alarm of the invention is manifested by the features that the filter arrangement is formed by a combination of a first filter element selected from the group of germanium- or silicon filters, a second or further filter element selected from the group of sapphire filters, rutile filters and infrared-permeable or transmissive calcium aluminate-, germanate- or magnesium fluoride-glasses, and a narrow band filter which is permeable or transmissive for the resonance radiation of carbon dioxide. As a sensor element there can be used a pyroelectrical element which guarantees for an optimum sensitivity.

BRIEF DESCRIPTION OF THE DRAWING

The invention will be better understood and objects other than those set forth above will become apparent when consideration is given to the following detailed description thereof. Such description makes reference to the annexed drawing wherein the single FIGURE illustrates an exemplary embodiment of radiation detector according to the invention.

DETAILED DESCRIPTION OF THE PREFERRED EMBODIMENTS

The radiation detector illustrated by way of example in the drawing comprises an almost hermetically sealed detector housing 1, internally of which there is arranged a printed circuit board 10 which contains a suitable evaluation circuit of the flame detector as is well known in this technology. Plug-connected and soldered onto the printed circuit board 10 is a further conventional housing 11 of the commercially available type TO-5. At the front end or face of this further housing 11 there is provided a first filter element 6. This filter element 6 is formed of, for instance, a germanium disc 6 having a thickness of about 1 mm. Vapor deposited onto both sides or faces of this germanium disc 6 are narrow band filters 5 and 5' defining interference filters or filter layers. Each of these interference filter layers 5 and 5' equally can also be composed of several layers, so that there is formed a narrow band filter with a transmission or permeability range of 4.1–4.8 $\mu$m, preferably 4.3–4.4 $\mu$m. At the front end or face of the alarm housing 1 there is suitably connected, for instance cemented a further filter element 4 which is formed, for instance, of a sapphire disc having a thickness of about 1 mm. This filter element 4 defines an upper limit of the radiation at about 5.5 $\mu$m, while the germanium filter element 6 defines a lower limit at about 1.5 $\mu$m.

Instead of a sapphire filter element there also can be used a rutile filter, a calcium aluminate glass, e.g. of the commercially available type IRG 11 (available from the well known West German company Schott), a germanate glass, e.g. of the type IRG 2 (likewise available from Schott) or a magnesium fluoride glass, e.g. of the type Irtran 1 (available from the well known United States company Eastman Kodak). Also, instead of using a germanium filter there can be used a silicon filter.

To the filter element 4 there can be attached an auxiliary or additional filter 12 which possesses an absorbtion band at a wavelength of about 4 $\mu$m. The material forming the auxiliary filter 12 in any case should be permeable or transmissive for radiation between 4.1 and 4.7 $\mu$m, while absorbing radiation having a wavelength in the range of about 3.5–4.0 $\mu$m. This auxiliary filter 12 limits the radiation which, with wavelengths of less than 4.0 $\mu$m, is transmitted or passed by the narrow band filter 5 and 5' in the case of an angular or oblique incidence. For forming the auxiliary or additional filter 12 the following materials have proven to be particularly suitable: Dymerex resin (to 80% dimerized rosin; available from Hercules Corp.); polymerized rosin (acid number 160) (rosin polymerized with $BF_3$-etherate, a laboratory preparation of K. Hultzsch Corp., CWA Corp.), polypale resin (polymerized rosin; Hercules Corp.), Gamopal P (melted Congo copal, partly esterified; Maserel Corp.), Liodammar EH (modified dammar resin; Sichel-Werke Corp.), Liodammar N (modified dammar resin; Sichel-Werke Corp.), Perbunan-Latex KA 5408 (copolymer of butadiene, styrene, acrylonitrile and methacrylic acid; Bayer Corp.), Perbunan-SN-Latex 15 M (copolymer of butadiene, styrene, acrylnitrile and methacrylic acid; CWH Corp.), and Butakon ML 501. (aqueous dispersion of a butadiene-methylmethacrylate copolymer, ICI Corp.).

Upon the base plate 7 and within the internal space of the TO-5-housing 11 there is provided a pyroelectrical element constituting the radiation sensor 2. This pyroelectrical element 2 has a sensitivity which extends into the far infrared and displays optimum sensitivity throughout the entire resonance band of carbon dioxide. It has been found to be particularly beneficial to use a pyroelectrical element formed of lithium-tantalate. Other suitable elements are triglycine sulfate, lead-zirconate-titanate (PLZT-ceramics) or lead-zirconate-iron-niobate. Equally suitable is a pyroelectrical film formed of polyvinyldifluoride. Such pyroelectrical elements suitable for flame alarms are manufactured and distributed, for instance, by the well known companies Eltec (USA) and Plessey (England). A particularly good sensitivity is achieved with a radiation-sensitive surface, for instance, of 2×2 mm, a size which is available in conventional flame detectors. The arrangement or positioning of the sensor element 2, in the herein described embodiment, is chosen such that the flame alarm possesses a viewing angle of about 135°.

By means of the herein described filter combination there is achieved a limitation of the transmissivity or permeability range to the immediate neighbourhood of the carbon dioxide-resonance line at 4.3–4.4 $\mu$m.

In the region of visible light and near infrared up to 1.5 $\mu$m, this filter combination is absolutely non-transmissive or impermeable. Between 1.5 $\mu$m and up to the lower edge of the bandpass for carbon dioxide at about 4.1 $\mu$m, and between the upper edge of the bandpass at about 4.8 $\mu$m and the upper edge of the sapphire filter there occurs a damping of the incident light by a factor of at least 1000, i.e. the transmission or permeability is less than 0.1%. Above the upper edge of the sapphire filter at 6 $\mu$m the impermeability again is almost absolute. Spurious radiations, such as solar radiation and daylight, or radiation emanating from artificial light sources, such as light bulbs or fluorescent lamps, as well as other disturbances, such as welding sparks and so forth, which do not have a marked intensity maxima at the resonance wavelength of carbon dioxide, are thus almost completely kept away from the sensor element by means of the herein described filter, even if such radiation is of a considerably higher intensity than the flame radiation, for instance more than one thousandfold the intensity thereof. Thus, even in the presence of light and other spurious radiation, it is possible to extremely reliably detect flame formation in the initial or incipient stages and to differentiate the same from other radiation. With the employment of the described filter combination it is possible to use an especially sensitive sensor element, such as the aforementioned pyroelectrical elements, without causing a sensitivity loss. In comparison to prior art filter combinations containing quartz-filter elements, the sensitivity is more than doubled by means of the filter combination according to the present invention.

By means of the connections 3 or the like the pyroelectrical element 2 is connected to the evaluation circuit of the printed circuit board 10. Upon the presence and detection of flame radiation this evaluation circuit triggers a corresponding signal in conventional manner. In principle, it is sufficient for this purpose to use a threshold switch, as has frequently been disclosed in the fire alarm art. Since the pyroelectrical element possesses differential characteristics, i.e. since its output signal does not correspond to the absolute value but to the speed of change, constant or slowly changing signals are automatically blocked. A flame alarm equipped with the herein described radiation detector thus only requires a simple and uncomplicated evaluation circuit, and therefore, is appreciably more reliable in operation and less prone to disturbances than heretofore known prior art flame alarms. Yet, the selectivity with respect to flames and the non-sensitivity to spurious radiation are considerably improved. However, if especially unfavorable operating conditions require a still higher or practically absolute selectivity for flame radiation, then the evaluation circuit also can be constructed such that additional flame criteria are evaluated, for instance as disclosed in Swiss Patent Nos. 509,633, 519,761, 537,066 or 558,577. For the same purpose and with reference to German Patent Publication Nos. 2,823,410 or 2,823,411, the herein described radiation detector can be connected in a logical circuit to a second radiation detector which is sensitive to visible light or far infrared.

While there are shown and described present preferred embodiments of the present invention, it is to be distinctly understood that the invention is not limited thereto but may be embodied and practiced within the scope of the following claims. Accordingly,

What I claim is:

1. A radiation detector for a flame alarm comprising:
   a sensor element;
   a filter arrangement positioned forwadly of said sensor element;
   said filter arrangement being transmissive for the resonance radiation of carbon dioxide;
   said filter arrangement comprising:
      a first filter element comprising at least any one of a germanium filter and silicon filter;
      a further filter element comprising at least one of a sapphire filter, a rutile filter, infrared-transmissive calcium aluminate glass, calcium germanate glass and magnesium fluoride glass;
      a narrow band filter which is transmissive for the resonance radiation of carbon dioxide;
      an auxiliary filter;
      said auxiliary filter being structured to absorb radiation having a wavelength in the range of 3.5–4.0 $\mu$m; and
      said auxiliary filter transmitting radiation having a wavelength in the order of about 4.1–4.7 $\mu$m.

2. The radiation detector as defined in claim 1, wherein:
   the transmission range of said narrow band filter includes the resonance wavelengths of carbon dioxide at approximately 4.3–4.4 $\mu$m.

3. The radiation detector as defined in claim 2, wherein:
   said transmission range of said narrow band filter is in the order of about 4.1–4.8 $\mu$m.

4. The radiation detector as defined in claim 2 or 3, wherein:
   said narrow band filter is structured as an interference filter.

5. The radiation detector as defined in claim 4, wherein:
   said interference filter comprises a number of layers which have been vapor deposited onto the first filter element.

6. The radiation detector as defined in claim 5, wherein:
   said first filter element is a germanium filter element.

7. The radiation detector as defined in claim 6, wherein:
   said vapor deposited layers are deposited at both sides of said germanium filter element.

8. The radiation detector as defined in claim 1, wherein:
   said sensor element comprises a pyroelectrical sensor.

9. The radiation detector as defined in claim 8, wherein:
   said sensor element is formed of lithium-tantalate.

10. The radiation detector as defined in claim 8, wherein:
    said sensor element is formed of lead-zirconate-titanate.

11. The radiation detector as defined in claim 8, wherein:
    said sensor element is formed of lead-zirconate-iron-niobate.

12. The radiation detector as defined in claim 8, wherein:
    said sensor element is formed of polyvinyldifluoride.

13. The radiation detector as defined in claim 8, wherein:
    said sensor element is formed of triglycine sulfate.

14. The radiation detector as defined in claim 1, wherein:
    said auxiliary filter is applied to said further filter element in the form of a layer.

15. The radiation detector as defined in claim 1 or 14, wherein:
    said auxiliary filter is formed of Dymerex resin.

16. The radiation detector as defined in claim 1 or 14, wherein:
    said auxiliary filter is formed of polymerized rosin (acid number 160).

17. The radiation detector as defined in claim 1 or 14, wherein:
    said auxiliary filter is formed of Polypale resin.

18. The radiation detector as defined in claim 1 or 14, wherein:
    said auxiliary filter is formed of Gamopal P.

19. The radiation detector as defined in claim 1 or 14, wherein:
    said auxiliary filter is formed of Liodammar EH.

20. The radiation detector as defined in claim 1 or 14, wherein:
    said auxiliary filter is formed of Liodammar N.

21. The radiation detector as defined in claim 1 or 14, wherein:
    said auxiliary filter is formed of Perbunan-Latex KA 5408.

22. The radiation detector as defined in claim 1 or 14, wherein:
    said auxiliary filter is formed of Perbunan-SN-Latex 15 M.

23. The radiation detector as defined in claim 1 or 14, wherein:
    said auxiliary filter is formed of Butakon ML 501.

* * * * *